Aug. 10, 1965      J. G. LIVINGSTONE      3,199,750
COVER FOR EXTENSIBLE SPOUT, RELEASABLE AS SPOUT IS EXTENDED
Filed Feb. 13, 1963                               2 Sheets-Sheet 1

INVENTOR
Jay G. Livingstone

BY Jordon C. Mark

ATTORNEY

Aug. 10, 1965 J. G. LIVINGSTONE 3,199,750
COVER FOR EXTENSIBLE SPOUT, RELEASABLE AS SPOUT IS EXTENDED
Filed Feb. 13, 1963 2 Sheets-Sheet 2

INVENTOR
Jay G. Livingstone
BY
ATTORNEY

United States Patent Office 3,199,750
Patented Aug. 10, 1965

3,199,750
COVER FOR EXTENSIBLE SPOUT, RELEASABLE AS SPOUT IS EXTENDED
Jay G. Livingstone, 715 W. Market St., Akron 3, Ohio
Filed Feb. 13, 1963, Ser. No. 258,678
15 Claims. (Cl. 222—529)

This application is a continuation-in-part of my application Serial No. 155,228 filed Nov. 8, 1961 which was a division of my application Serial No. 698,414 filed Nov. 25, 1957 (now abandoned), which was a continuation-in-part of my application Serial No. 587,711 filed May 28, 1956 (now abandoned), and it is also a continuation-in-part of my application Serial No. 787,724 filed Jan. 19, 1959, now U.S. Patent No. 3,089,621.

This invention relates to a container and removable fitment therefor, usually a cover, both constructed in a novel manner. It includes the container, the fitment, the combination of the fitment and the container, and the processes of assembling and disassembling the fitment and the container.

The invention will be described more particularly in connection with the use of a cover, but is equally applicable to the use of other fitments.

The container includes a shallow frusto-conical top having fastened to its inner edge a depressible spout for the discharge of liquid or granular solid particles from the container, through an outlet in the end of the spout farthest from the container. There is an upwardly opening mouth in the outer surface of the spout, and this surrounds the outlet. A lip at the mouth of the inner wall of the groove protrudes outwardly. A bead adjacent the bottom of the fitment is adapted to be located in this groove. The inside diameter of the bead is less than the diameter of the outer edge of the lip on the inside wall of the groove. The bead must be pressed over this lip to engage it in the groove and must be drawn out over frictional engagement with this lip when the fitment is removed from the container. The outer wall of the groove presses the bead under this lip and in a preferred form of the invention the outer wall of the groove is provided with a lip at its mouth to assist in retaining the bead in the groove. When the spout is extended the groove is spread open so that the bead can be placed into it or removed from it, but when the spout is depressed, the outer wall of the groove presses against the bead and retains it in the groove. If there is a lip on the outer wall of the groove, this is closed over the bead when the spout is depressed and presses on the bead, holding it in the groove; and when the spout is extended this lip is flexed away from the bead and does not interfere with its entrance into, or removal from, the groove.

The spout is of flexible material, either metal or a plastic, and the container is advantageously a plastic bottle, but it may be a bottle or other container composed of any suitable material to which the spout, preferably a plastic spout, is attached. If the bottle is of plastic the spout is advantageously composed of the same plastic and may be somewhat thinner than the wall of the bottle to render it easily flexible. When the spout is extended the mouth is open and when it is depressed the mouth is closed.

The fitment can readily be locked in place on the container in a single movement, and this makes this type of container attractive to the packager. Likewise, the fitment is easily removed intact, and may be readily replaced, and if the fitment be a cover, this makes this type of package attractive to the consumer, who may be a housewife, a pharmacist, or anyone else.

The invention is further described in connection with the accompanying drawings, in which FIGURE 1 is a view in perspective of a plastic container with the cover removed and the spout extended;

Figure 1:
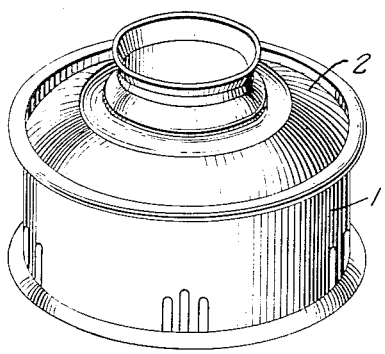
Figure 2:
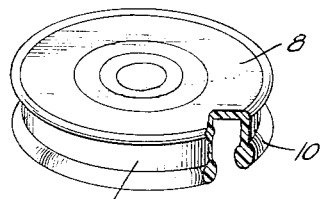
FIGURE 2 is a view in perspective of the plastic cover with a part broken away to illustrate its construction.
Figure 3:
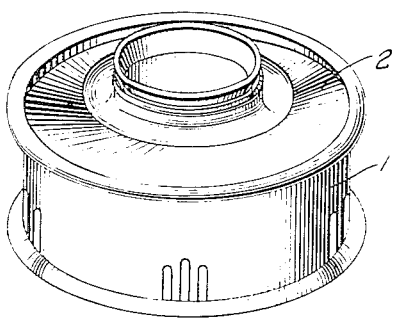
FIGURE 3 is a view similar to FIGURE 1 but with the spout depressed.

In FIGURES 1 to 5, the body 1 and spout 2 of the container are both made of the same plastic. The spout 2, and particularly the portion connecting the container with the mouth 3 may be of thinner plastic than the body 1 and the upright portion or neck 6, to facilitate flexing. The closure cap or cover 8 is provided with a depending wall 9 and a bead 10 around its bottom. The inside diameter of the bead is less than the outside diameter of the lip 15 on the inner wall of the groove, at its mouth.

When the spout is extended, as by lifting the neck 6, the lips 15 and 16 are spread apart and the mouth 3 between them widens. The bead 10 of the cover 8 can then be pushed down into the mouth 3 over the lip 15 or, if already in the mouth, it can easily be separated from the container by withdrawing it over this lip. When the spout is depressed, as in FIGURE 5, the lip 16 closes onto the bead and holds it within the groove. The cover can be removed only if the spout is extended so as to pull the lip 16 out of contact with the bead.

Figure 5:
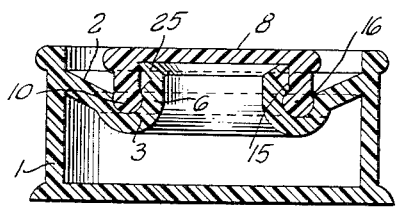
FIGURE 5 is a section through the package shown in FIGURE 4.

When the spout is depressed, as illustrated in FIGURE 5, the container may be as tight as a container fitted with a screw cap. This will depend upon the hardness of the bead and the spout. Normally they will both be sufficiently resilient to form an air-tight seal around the bead when the spout is depressed. The groove may be fitted with a resilient plastic gasket but this is usually unnecessary.

In a plant where material is packaged in these containers, the containers are normally supplied to a covering machine with the spouts extended. A cover is pushed down over the neck of each container as it reaches the machine, and with pressure (ordinarily applied to the cover only) the spout is depressed to the position shown in FIGURE 5, and the lip 16 closes over the bead 10 and locks the cover in place. The seal between the bead and the lips or other part of the container may be a very tight seal, depending not only upon the shape of the co-acting parts, but also upon how resilient the plastic is. The neck 6 is shown as provided with an outlet having a pouring lip 25 which narrows to a knife edge at its outer circumference and the knife edge is undercut as shown. This provides a non-drip pouring spout.

Figure 6:
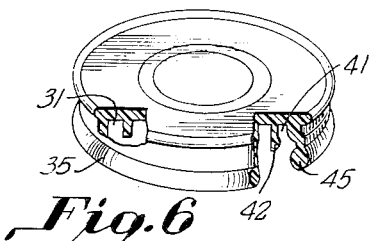
FIGURE 6 is a composite of two differently constituted covers, broken away on the right and the left to show different attaching structures.
Figure 7:
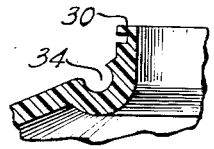
FIGURE 7 is a detail of a portion of an extended plastic spout adapted to be covered by a closure of the structure shown in the left half of FIGURE 6.
Figure 8:
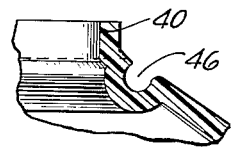
FIGURE 8 is a detail of an extended plastic spout of different construction adapted to be closed by a closure having the structure shown in the right half in FIGURE 6.

FIGURES 6–8 show alternative spout structures. The spout of FIGURE 7 is a non-drip spout by virtue of the fact that the lip 30 has such a narrow outer edge and is undercut. When a cover of the structure shown at the left in FIGURE 6 is lowered onto a container with such a spout, the lip 30 enters the opening 31, and as the cover and container are brought together, the bead 35 fits into the mouth 34 as the lip 30 is wedged into opening 31, and by depressing the spout the mouth 34 closes and presses against the bead 35, holding it in place.

FIGURE 8 shows a spout of somewhat similar construction, but there is no special pouring lip at the top of the neck. The neck 40 fits into the opening 41 in the cover and there is a flexible flange 42 with a bulbous bottom which presses against the inner wall of the lip 40 and forms a tight seal. As the lip 40 is wedged into the opening 41, the bead 45 enters the mouth 46. The cover is put over the end of the spout when the spout is extended, and by pressure of the cover on the container as the two are brought together, the spout is depressed and the mouth 46 closes against the bead 45 and locks the cover in place.

Figure 4:
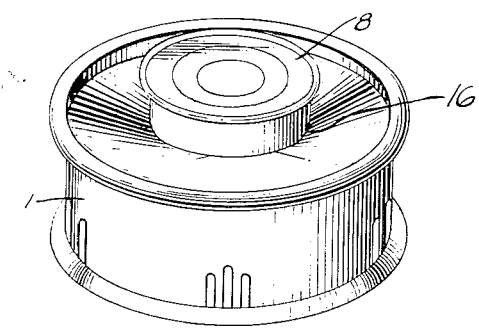
FIGURE 4 is a view identical with that shown in FIGURE 3 but with the cover in place.
Figure 9:
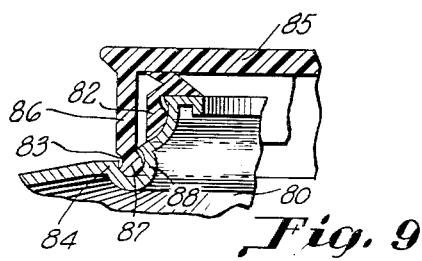
FIGURES 9 and 10 are a section and plan view, respectively, of a fitment snapped on to the neck of a metal container with a closure cap engaged in a groove in the spout of the can.
Figure 10:
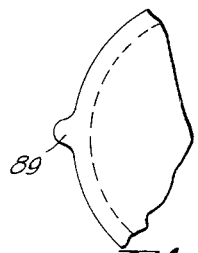

In the structure of FIGURES 9 and 10 the top of the can 80 and the fitment 82 are of the same design as shown in FIGURE 4, except that there is a depression 83 in the outer surface of the bead 87 at the bottom edge of the cap, and the lip 84 at the outer rim of the groove closes against this as the spout is depressed. By having a depression in the outer surface of the bead, the lip 84 retains the bead within the groove more readily than if the bead were rounded. The cap 85 is not threaded on to the vessel. The bottom edge of the wall 86 of the cap is inclined slightly inwardly and terminates in the bead 87. There may be a resilient gasket in the groove to form a tight seal. The neck is formed integrally with the balance of the top of the vessel, and this top would ordinarily be united to the side wall of the vessel, as illustrated in FIGURE 1. The cap is provided with a lip 89 (FIGURE 10) to assist in its removal.

When the bead 87 of the cap is engaged in the groove 88 and closing pressure is continued, the inner surface of the top of the cap presses downwardly on the lip of the fitment, depressing it and making a liquid-tight seal between the fitment and the top of the cap. This pressure also forms a tight seal between the horizontal bottom of the fitment 82 and the horizontal wall at the top of the neck of the can, so that there is no possibility of any leakage of liquid when the cap is in place, even though the vessel be upset.

The assembly of FIGURES 9 and 10 is very easily accomplished. The fitment is merely snapped over the end of the neck with the spout extended, and the closure cap is snapped in place by downward pressure which causes the lip 84 to close against the bead as the spout is depressed. No turning of any element with rsepect to another is required, as where a cap must be screwed on to the neck of a vessel.

Figure 12:
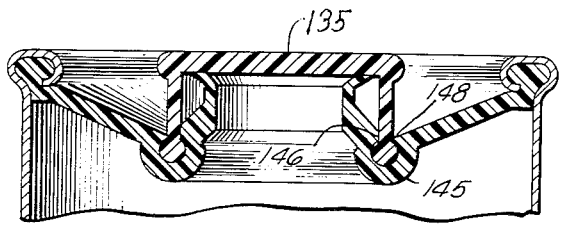
FIGURE 12 is a section through a similar arrangement, with the spout depressed and the closure locked in position, the groove being of a different construction.
Figure 11:
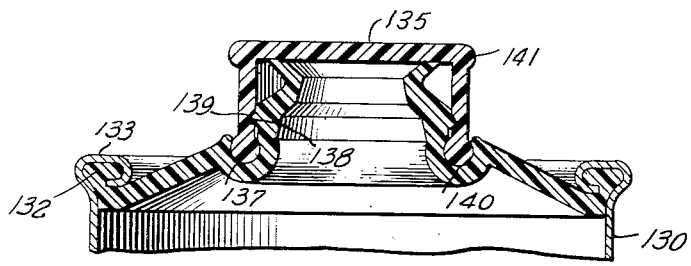
FIGURE 11 is a section through a depressible spout on a rigid container with the outlet thereof in a plastic spout closed by a removable cover.

FIGURES 11 and 12 show sectional views of two slightly different depressible plastic spouts, each suitably fastened at its outer edge to the top of the wall 130 of a metal can. This may be the side wall of the can or merely the wall of the neck of the can. The can may be of heavy gauge. The spout is held on the can by any suitable means, as by crimping a bead 132 on the outer edge of a spout within the rolled top 133 of the can metal.

The cap 135 is relatively or perfectly rigid and is preferably made of plastic, although it may be of glass or metal. There is a bead 137 at its bottom edge which is held in the mouth of the spout. The mouths are of somewhat different construction. In FIGURE 11, the cover and spout are interengaged by the lip 138 on the spout which fits into the depression 139 in the wall of the cover. The mouth 140 has no restricting lip around its outer edge. When the spout is extended as in FIGURE 11, the mouth is opened sufficiently to permit the bead 137 to enter it, or to be withdrawn, as the case may be, by snugly fitting the bead 137 under the lip 138, or slipping the bead out from under the lip. However, when the spout is depressed the mouth closes against the bead, locking the cover in position. The top edge of the cover is formed with the bead 141 to facilitate pulling the flexible spout up from its depressed position in order to remove the cap.

The top of the cap 135 is advantageously in the same plane as the top 133 of the can wall when the spout is depressed so that it will fit into a box or carton or other shipping container, and this will hold the spout depressed and lock the cap in position (regardless of the position of the shipping container) insuring a tight seal until the shipping container is opened.

In the combination of FIGURE 12 the cover and container are not interlocked as at 138, 139 in FIGURE 11. The bead 145 slips over the bead 146 on the inner edge of the groove. The lip 148 on the outer edge of the groove presses on the bead when the spout is depressed, but opens away from the bead when the spout is extended.

Figure 13:
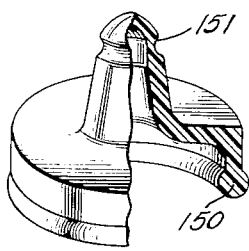
FIGURE 13 is a perspective view of a different type of closure.

FIGURE 13 is a perspective view of a different type of fitment or closure which can be used with any of the vessels. It is preferably made of plastic, and may be rigid or soft and resilient. The bead 150 fits into a groove in the neck of a vessel. The indentation 151 is provided to facilitate removing the end of the cover to convert this to a pouring spout.

The assembly of the covers on to the containers is very easily accomplished. Pressure alone is required. No turning of any element, or the screwing of one element into the other is required. Furthermore, the cap is readily removed from the container intact.

The outlet from the container may be open as shown; it may be provided with a shaker top or any other suitable fitment. Instead of the groove in the outer surface of the spout engaging a cover, it may engage the bottom of any type of fitment.

Although unwanted gas or vapor ordinarily escape as the cover is pressed on to the container and the bead on the cover is sealed in place in the groove in the outer surface of the container, an escape valve, such as an ordinary flap valve, may be provided in the top of the cover or in any other suitable location to release unwanted gas or vapor.

The various drawings and description are illustrative. Polyethylene and polypropylene are particularly adapted for the manufacture of plastic containers and covers as disclosed. The metal containers and spouts may be of suitable gauge and composition. Modifications can be made within the scope of the following claims which define the invention.

What I claim is:

1. The combination of a container with an outlet in a spout on the container and a removable fitment which is fit over the outlet, the container comprising a body with a shallow frusto-conical top to the inner edge of which the spout is joined, the container being flexible at this juncture and at the juncture of the outer edge of said top to said body of the container so that the spout is movable toward and away from the interior of said body by depressing and extending the top, a circular groove near said juncture which opens away from the body with the width of the mouth of the groove widened by movement of the spout away from said interior and narrowed by movement thereof toward said interior, and said groove being wider inwardly than at the mouth when so narrowed, said fitment having a wall with a circular bottom and a bead thereon located in said groove, said bead being narrower than said mouth when the top is extended and wider than the mouth when the top is depressed.

2. The combination of claim 1 in which the fitment is a closure for the outlet.

3. The combination of claim 1 in which the spout and top are made of flexible plastic.

4. The combination of claim 1 with interlocked means in the outer wall of the spout and the inner wall of the fitment.

5. The combination of claim 1 in which there is a lip on the outer wall of the groove which flexes toward and away from the groove as the spout is depressed and extended.

6. The combination of a container with a shallow frusto-conical top, a depressible spout attached to the inner edge of said top with a pouring outlet at the outer end of the spout, the spout being provided in its outer surface with an upwardly opening circular mouth at the juncture of the top and the spout which mouth narrows as the spout is depressed and a filament with a circular bottom which is enlarged, with the enlargement located in the mouth and lockable therein by such depression of the spout, the inside diameter of the enlarged portion of the fitment being less than that of the inner edge of the mouth.

7. A vessel with a depressible spout thereon having an opening therethrough, the top of the vessel flexibly attached to the wall of the vessel and having a shallow frusto-conical top extending outwardly from the base of the spout, which top is flexibly joined to the wall of the container and an indentation surrounding the neck at the juncture of the spout and said top of the vessel which indentation is narrowed and widened as the neck is depressed and extended, said indentation narrowing at the mouth when the neck is depressed.

8. In combination with the vessel of claim 7 a closure cap with a bead at the bottom of the cylindrical wall thereof, the inside diameter of the bead being slightly less than the diameter of the inner edge of the mouth of the indentation when the spout is extended and slightly greater than said edge when the spout is depressed, said bead being engaged in the indentation.

9. The combination of claim 7 in the closure cap of which, inside of the circular wall and depending from the top of the closure cap there is a space which narrows toward said top in which the top of the spout is squeezed.

10. The combination of claim 7 in which the top of the spout terminates in an outwardly flaring thin wall which is in pressure contact with the undersurface of the closure cap.

11. The combination of claim 7 in which the top of the spout and the closure cap are in sealing contact.

12. The method of fastening a fitment with a bead at its base, on a vessel having a shallow frusto-conical top flexibly joined to the wall of the vessel, with a spout having an opening therethrough flexibly joined to the inner wall of the top, and a groove encircling the spout, the top being adapted to be extended to thereby widen the mouth and to be depressed to thereby narrow the mouth, the mouth of the groove being narrower than its greatest inner width when the top is so depressed the mouth of the grove being narrower than its greatest inner width, and the top being adapted to be extended to thereby widen the mouth and to be depressed to thereby narrow the mouth, the bead being of such a size as to fit snugly within the groove and be held there when the top is depressed and to be removable therefrom when the top is extended, which method comprises engaging the bead in the groove when the top is extended and depressing the top with the bead in the groove and thereby closing the mouth of the groove over the bead.

13. The process of claim 12 in which the fitment is a cover and the spout is depressed by pressure on the cover.

14. The method of removing a fitment from a vessel, the fitment having a bead at its base and the vessel having a shallow frusto-conical top flexibly joined to the wall of the vessel, a spout flexibly joined to the inner edge thereof and a groove encircling the same, the groove narrowing at the mouth when the spout is depressed at the juncture, the spout being adapted to be depressed and extended by flexing the juncture, and with the bead snugly engaged in the groove, which method comprises extending spout and thereby opening the mouth of the groove, and then removing the bead from the groove.

15. The method claim 14 in which the fitment is a cover, and the spout is extended by pulling the cover.

References Cited by the Examiner
UNITED STATES PATENTS

| | | | |
|---|---|---|---|
| 1,823,861 | 9/31 | Michelin. | |
| 2,037,172 | 4/36 | Leffert | 222—498 X |
| 2,111,186 | 3/38 | Jenks | 222—545 X |
| 2,630,944 | 3/53 | Wheaton | 222—570 X |
| 2,661,128 | 12/53 | Rieke | 222—529 |
| 2,823,249 | 2/58 | Curtiss | 220—60 |
| 2,823,837 | 2/58 | Heinle | 222—546 |
| 2,828,789 | 4/58 | Groendyk et al. | 150—0.5 |
| 2,850,193 | 9/58 | Wieckman | 215—41 |

RAPHAEL M. LUPO, *Primary Examiner.*

UNITED STATES PATENT OFFICE
CERTIFICATE OF CORRECTION

Patent No. 3,199,750

August 10, 1965

Jay G. Livingstone

It is hereby certified that error appears in the above numbered patent requiring correction and that the said Letters Patent should read as corrected below.

Column 5, line 13, for "filament" read -- fitment --; column 6, lines 7 to 9, strike out "the mouth of the grove being narrower than its greatest inner width"; same column 6, line 24, beginning with "and a groove" strike out all to and including "snugly engaged in" in line 27, same column 6, and insert instead -- and a groove encircling the same at the juncture, the spout being adapted to be depressed and extended by flexing the juncture, the groove narrowing at the mouth when the spout is depressed, and with the bead snugly engaged in --.

Signed and sealed this 29th day of March 1966.

(SEAL)
Attest:

ERNEST W. SWIDER
Attesting Officer

EDWARD J. BRENNER
Commissioner of Patents